Oct. 16, 1962    C. D. NEUENSCHWANDER    3,058,447
RESTRAINING DEVICE FOR CATTLE

Filed May 4, 1959    5 Sheets-Sheet 1

INVENTOR.
Charles D. Neuenschwander
BY Patrick D. Beavers
ATTORNEY.

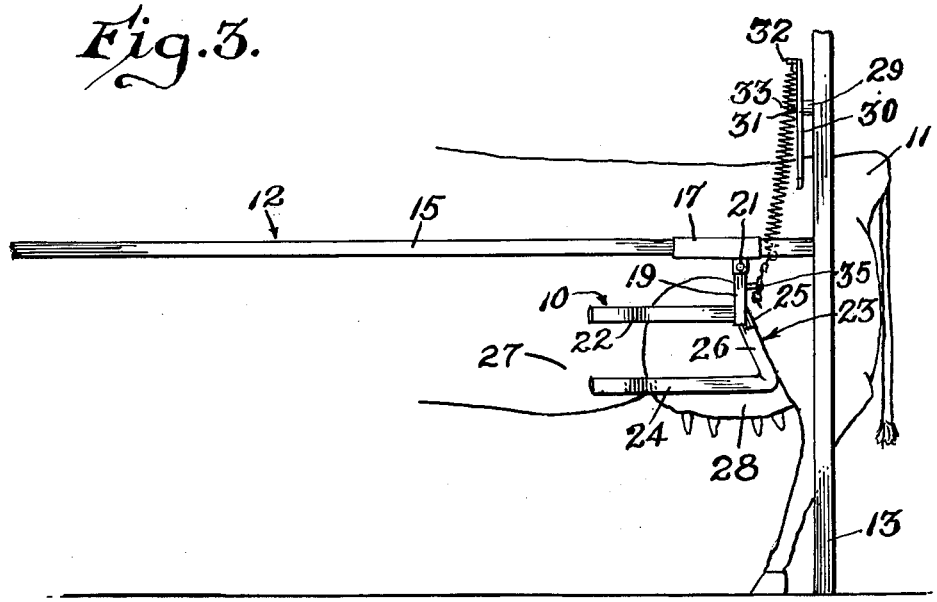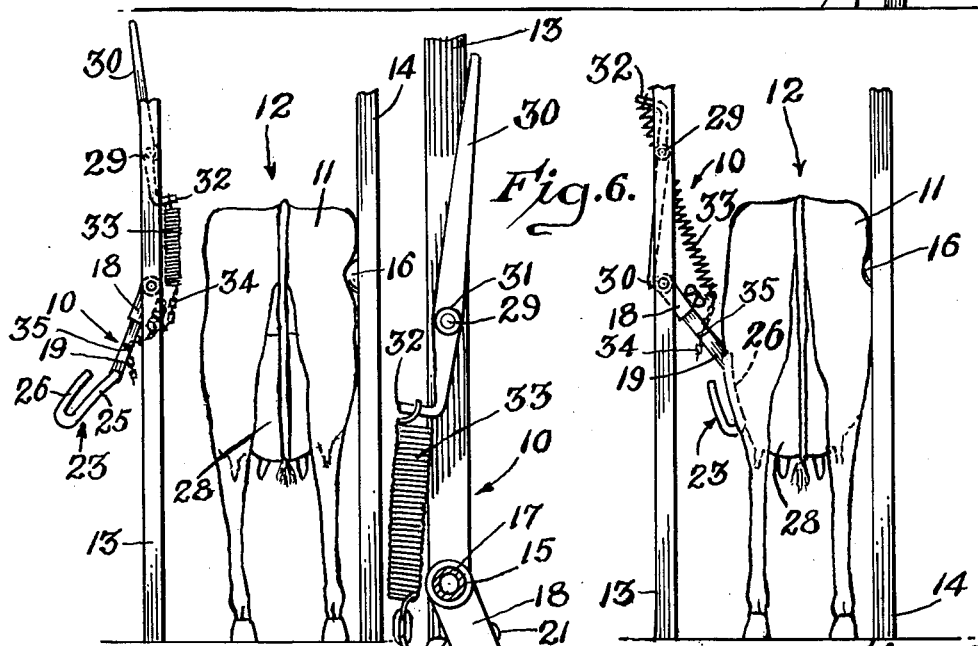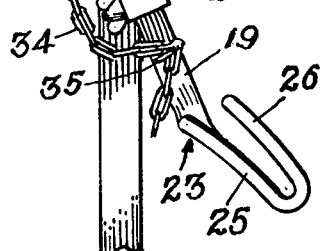

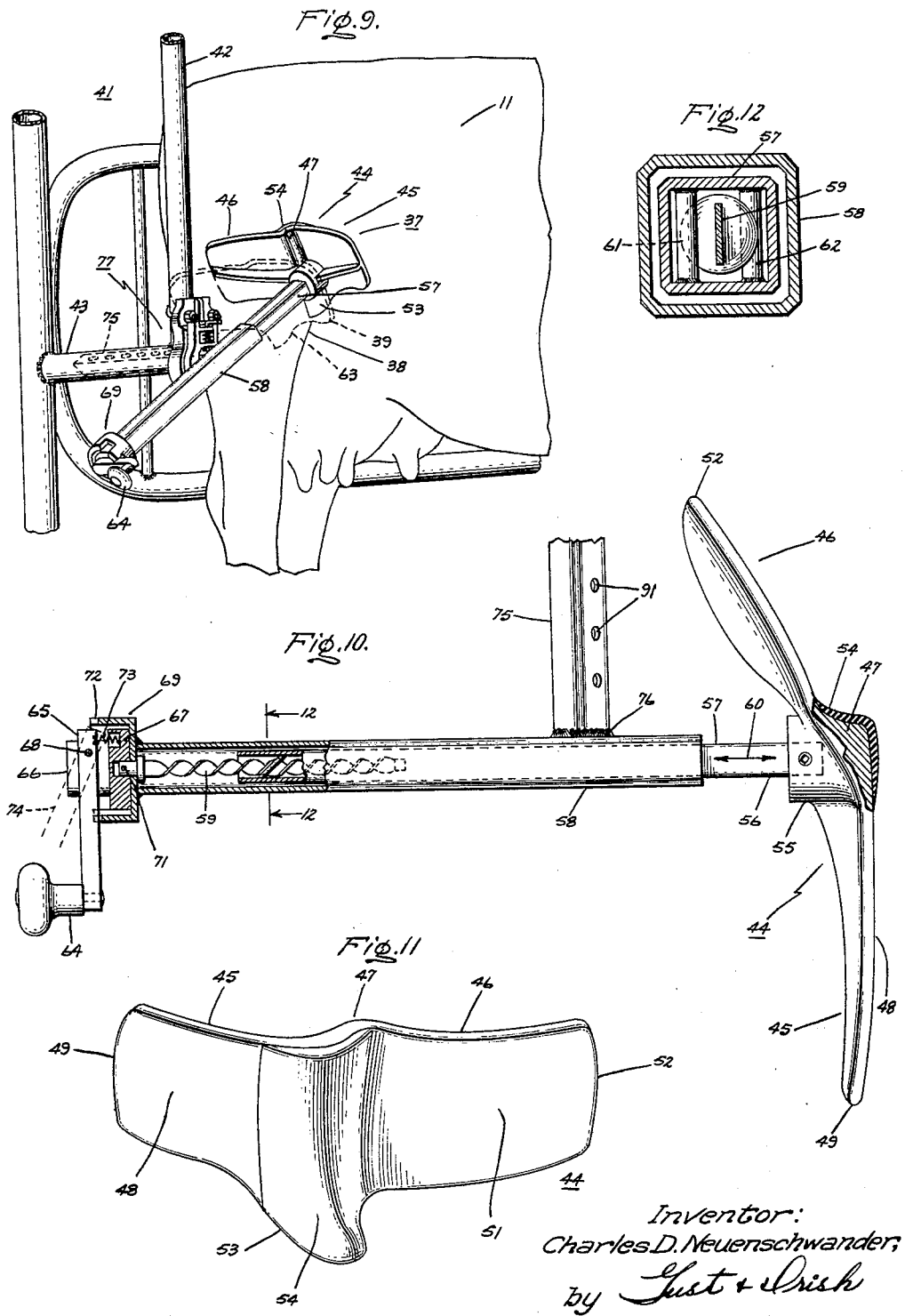

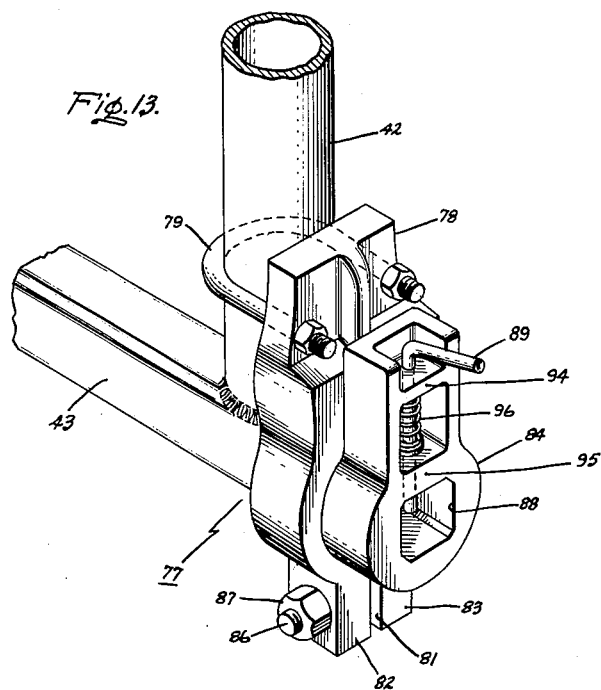
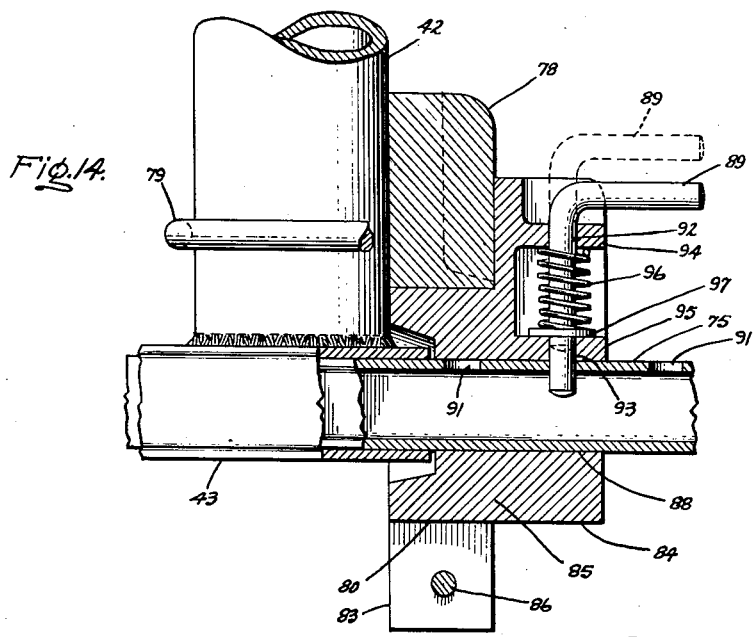

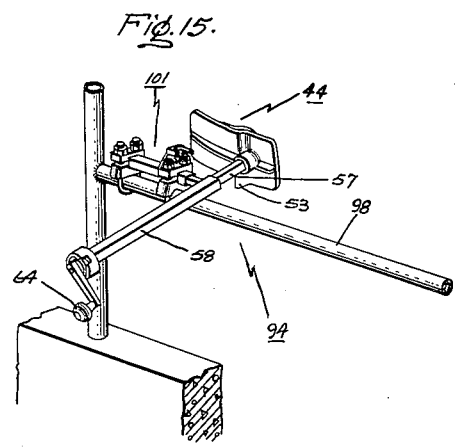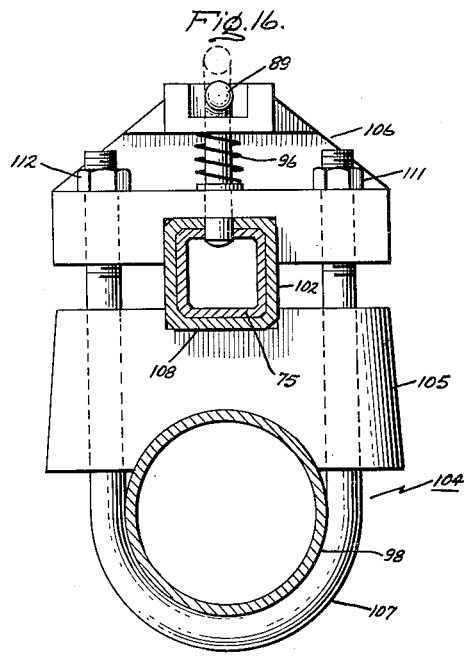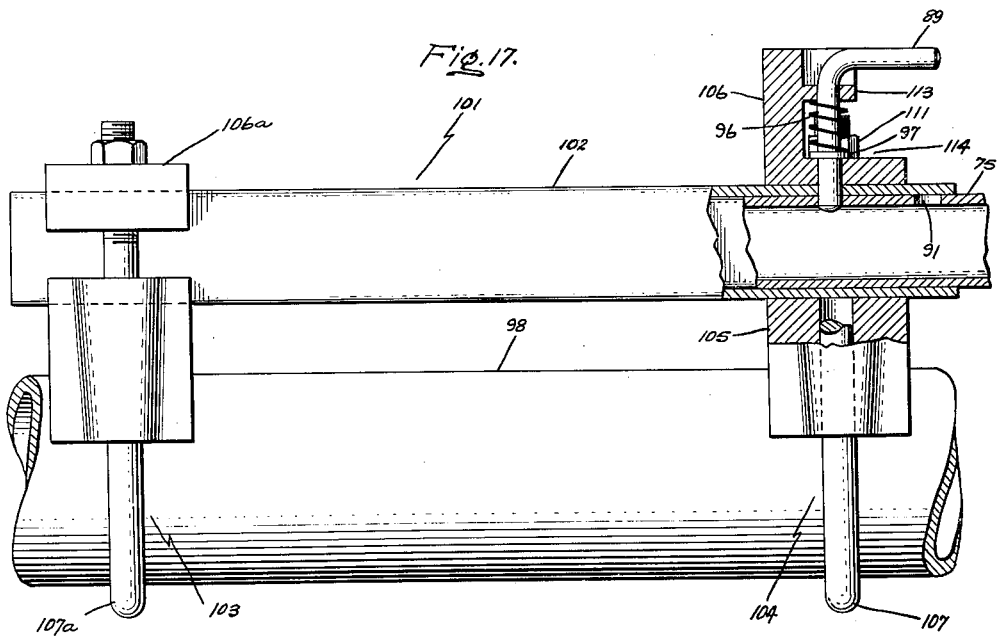

United States Patent Office
3,058,447
Patented Oct. 16, 1962

1

3,058,447
RESTRAINING DEVICE FOR CATTLE
Charles D. Neuenschwander, Rural Rte. 4, Bluffton, Ind.
Filed May 4, 1959, Ser. No. 810,966
4 Claims. (Cl. 119—96)

This invention relates to improvements in restraining devices that are especially adapted to prevent cows from kicking while they are being milked, and is a continuation-in-part of my co-pending application Serial Number 721,-549, filed March 13, 1958, now abandoned.

An object of the invention is to provide a restraining device that is adapted to be connected to a stall and when in use will train cows and young heifers to machine milking.

Another object of the invention is to provide a restraining device that can be moved into position to restrain a cow or young heifer or moved into a position out of restraining contact with the cow or young heifer.

A further object of the invention is to provide a restraining device that is simple in operation, construction and easy to install.

My invention, in its broader aspects, provides restraining apparatus for milking cows in which a restraining member is provided having at least a part thereof proportioned to extend generally forwardly from the anterior surface of the cow's rear leg adjacent the stifle joint thereof to a point on the cow's flank spaced from the stifle joint, and supporting means are provided attached to the restraining member and adapted to hold the same with the said part of the restraining member in engagement with the flank of the cow and with the rear edge of the part in engagement with the anterior surface of the cow's rear leg. This configuration and positioning of the restraining member restrains the cow from kicking since the cow, in order to kick, must move her stifle joint forwardly and upwardly, this movement being prevented by the restraining member. In the preferred embodiment of my invention, the restraining member takes the form of a shoe having a first part proportioned to extend forwardly from the anterior surface of the cow's rear leg adjacent the stifle joint to a point on the cow's joint spaced forwardly therefrom and having a second part proportioned to extend rearwardly from the anterior surface of the rear leg over the rear leg, the two parts being connected by a shoulder which bears against the anterior surface of the rear leg adjacent the stifle joint when the device is in operative position.

With the above and other objects and advantages in view, the invention consists of the novel details of construction, arrangement and combination of parts more fully hereinafter described, claimed and illustrated in the accompanying drawings, in which:

FIG. 3 is a view similar to FIGS. 1 and 2 with the restraining device in restraining position;

FIG. 4 is a view looking at the rear of the cow with the restraining device in the position of FIG. 2;

FIG. 5 is a view similar to FIG. 4 with the restraining device in the position of FIG. 3;

FIG. 6 is an enlarged vertical sectional view on the lines 6—6 of FIG. 2;

FIG. 9 is a view in perspective showing the preferred embodiment of my invention in operative engagement with the cow;

FIG. 10 is a fragmentary elevational view of the device of FIG. 9, partly in section and partly broken away;

FIG. 11 is a view in perspective showing the configuration of the inner surface of the restraining shoe of FIG. 9;

FIG. 12 is a fragmentary cross-sectional view taken along the line 12—12 of FIG. 10;

FIG. 13 is a fragmentary view in perspective showing the mounting bracket arrangement employed in the embodiment of FIG. 9;

FIG. 14 is a fragmentary side-elevational view, partly in section and partly broken away further showing the mounting bracket of FIG. 13;

FIG. 15 is a fragmentary view in perspective showing a different mounting arrangement for the restraining shoe assembly of FIG. 9;

FIG. 16 is a fragmentary end view, partly in cross-section, illustrating the mounting bracket arrangement employed in the embodiment of FIG. 15; and FIG. 17 is a fragmentary side-elevational view, partly in section and partly broken away further illustrating the mounting bracket arrangement of FIG. 15.

Figure 1:
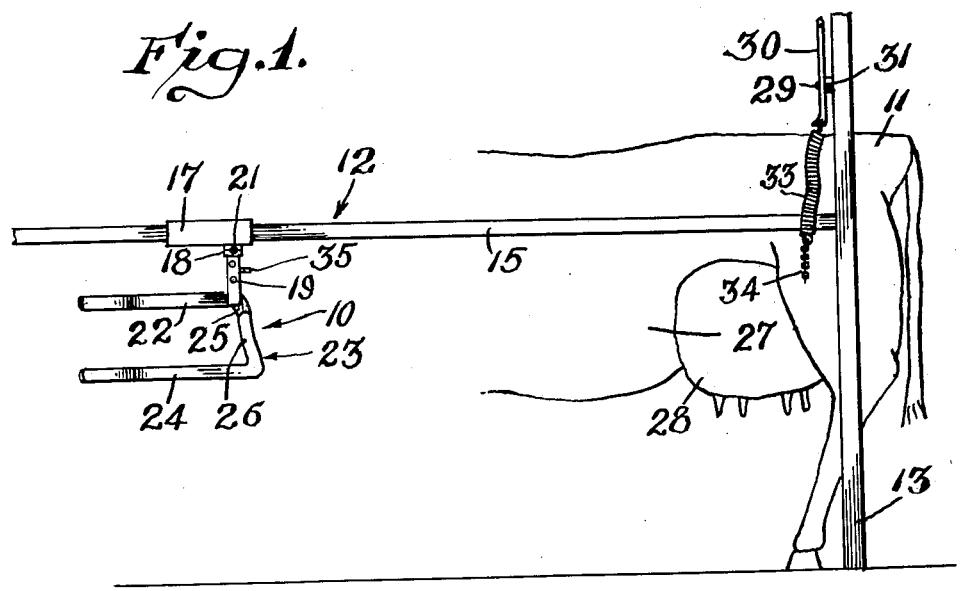
FIG. 1 is an elevational view of a restraining device embodying one embodiment of my invention with the device in inoperative position.

Referring more in detail to the drawings, wherein like parts are designated by like reference numerals, the reference numeral 10 is used to generally designate a restraining device embodying one form of the invention.

The restraining device 10 is adapted to be used on a cow or young heifer 11 that is placed in a stall 12 which comprises a pair of aligned vertically disposed tubular stanchions 13 and 14, respectively, that have horizontally disposed tubular bars 15 and 16 connected thereto and extending therefrom at right angles thereto to be connected to the wall of a barn in which the stall 12 is located.

The restraining device 10 comprises a tubular sleeve 17 that is slidably mounted on the bar 15. The sleeve 17 has a socket 18 that is integral therewith and a strap hanger 19 is receivable in the socket 18. The strap hanger 19 has a plurality of equally spaced openings 20 therein that are adapted to selectively receive a wing nut and bolt assembly 21 whereby the strap hanger 19 is adjusted in relation to the sleeve 17.

Connected to the lower end of the strap hanger 19 is the rear end of a leg 22 of a U-shaped yoke 23. The yoke 23 also includes a second leg 24 that is parallel to the leg 22 and joined thereto in spaced relation to the leg 22 by a cross member 25.

Extending outwardly of the leg 24 in parallel relation to the cross member 25 and integral with the leg 24 is an extension member 26. The cross member 25 and extension member 26 are inclined rearwardly with relation to the forward ends of the legs 22 and 24 and the extension member 26 is spaced from the cross member 25 so that the yoke 23 will engage the cow's barrel 27 and will, in this position, not interfere with the cow's udder 28. It will now be readily comprehended by reference to FIGS. 3 and 5 of the drawing that when yoke 23 is in operative position in engagement with the cow, its legs 22 and 24 bear against the flank portion 37 of the abdomen or barrel 27 of the cow 11 with the cross member 25 bearing against the anterior surface 38 of her rear leg adjacent the stifle joint 39 thereof, i.e., yoke member 23 extends generally forwardly from the anterior surface of the cow's rear leg adjacent the stifle joint conforming to the angle defined by the rear leg and the flank and by bearing against the anterior surface of the rear leg adjacent the stifle joint effectively restrains kicking; in order to kick, the cow must move the stifle joint of her rear leg forwardly and upwardly, however, engagement of the cross member 25 with the anterior surface of the rear leg effectively maintains the rear leg in its rearwardmost position, and prevents such forward and upward movement.

A pivot pin 29 is mounted in the stanchion 13 above the height of the cow 11 and extends forwardly of the stanchion 13 in parallel relation to the bar 15.

Figure 7:
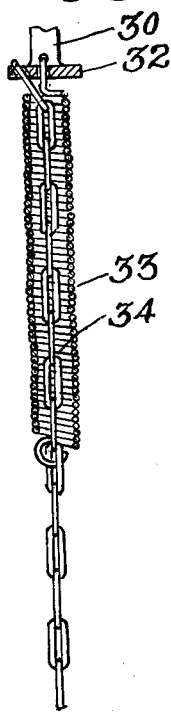
FIG. 7 is a longitudinal sectional view of the spring tensioning device.

A lever 30 is pivotally mounted on the pivot pin 29 and is spaced from the stanchion 13 by a spacer member 31 that is circumjacent to the pin 29. The lever 30 has a projection 32 on one end thereof that extends at right angles from the lever 30 and the projection 32 engages one end of a coil spring 33. A chain 34 is also connected at one end to the projection 32 and the chain extends through the coil spring 33, as shown in FIG. 7. The opposite end of the chain 34 is adapted to be selectively engaged with a hook 35 that is connected to the strap hanger 19 on a side opposite to the side to which the leg 22 is connected.

Figure 2:
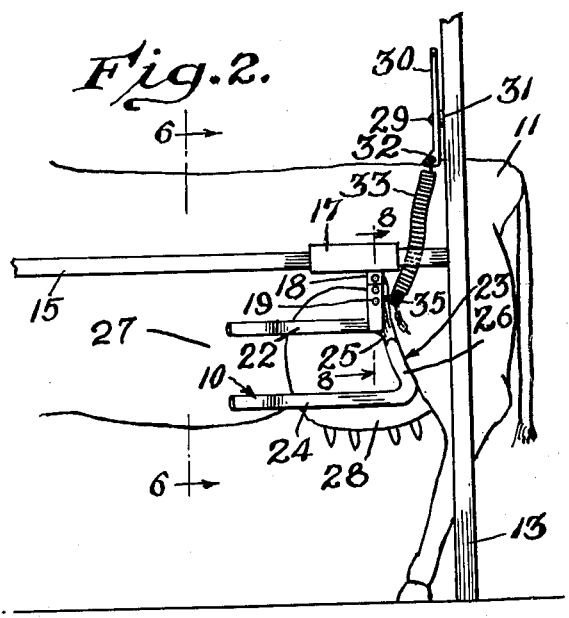
FIG. 2 is a view similar to FIG. 1 with the restraining device in preliminary position prior to being moved into restraining position.
Figure 8:
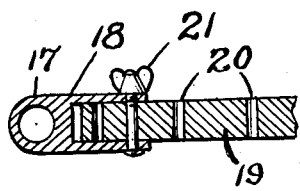
FIG. 8 is an enlarged sectional view on the line 8—8 of FIG. 2.

In operation the cow 11 is driven into the stall 12; at this time the sleeve 17 may be in any position on the bar 15, as shown in FIG. 1. When the cow 11 has quieted down, the sleeve 17 is moved into the position shown in FIG. 2, with the yoke 23 in position just forwardly of the anterior surface of the cow's rear leg 38. The chain 34 is then connected to the hook 35 so that there is a loop in the chain, as shown in FIG. 6.

The free end of the coil spring 33 is then hooked into the chain 34 so that there will be an expansion of the coil spring 33 and a tightening of the chain 34 when the lever 30 is pivoted downwardly to the position shown in FIG. 5. The coil spring 33 and chain 34 will move the yoke 23 into firm engagement with the cow's barrel 27. In this position the cow cannot push away from the yoke 23 against the operator. As the yoke 23 pushes against the cow 11, the cow will move sideways until the opposite side of the cow 11 will engage the bar 16, as shown in FIGS. 4 and 5. Thus, as the cow or young heifer moves the coil spring will always urge the yoke into engagement with the cow's barrel 27.

The strap hanger 19 is adjusted in relation to the socket 18 to care for large or small cows. However, due to the tension of the coil spring 33, cows of three to four hundred pounds difference in weight may be handled without changing the position of the strap hanger 19 with relation to the socket 18.

If the cow is used to the milking machine, the chain need not be connected to the strap hanger 19 and the yoke 23 will act as guard to guide the cow's leg past the operator should the cow kick for some reason.

Referring now to FIGS. 9 through 14 in which the preferred embodiment of my invention is shown, and in which like elements are indicated by like reference numerals, there is shown a portion of a milking parlor or cow stall 41 with cow 11 therein. The milking parlor 41 may be any commercially available type, the specific milking parlor construction shown by way of illustration in FIG. 9, being manufactured by the Babson Brothers Company, and having a vertically extending tubular element 42 joined at its lower end to a horizontally extending tubular element 43 disposed on one side of the cow 11. In this embodiment of my invention, the restraining member takes the form of a shoe 44 formed of suitable material, such as cast aluminum. Shoe 44 is elongated and generally rectangular in configuration and is formed of a first part 45 proportioned to extend generally forwardly from the anterior surface 38 of the cow's rear leg adjacent the stifle joint 39 to a point on the cow's flank 37 forwardly of the anterior surface, and a second part 46 proportioned to extend generally rearwardly of the anterior surface 38 over the rear leg, as shown in FIG. 9. Parts 45 and 46 are integrally connected by a shoulder portion 47. It will be observed with particular reference to FIG. 11 that the inner surface 48 of the forward portion 45 of shoe member 44 is relatively smooth and flat, curving outwardly from shoulder 47 to its forward edge 49 to conform to the configuration of the cow's flank 37. It will likewise be observed that the inner surface 51 of the rearward part 46 of shoe member 44 is also relatively smooth and flat, curving outwardly from shoulder 47 to its rear edge 52, thereby to conform to the configuration of the outer surface of the cow's rear leg.

The forward part 45 of shoe member 44 has an integral depending portion 53 adjacent shoulder 47 and forming an extension thereof. A pad 54 of suitable resilient material, such as rubber or neoprene, is affixed to the shoulder 47, as best seen in FIGS. 10 and 11, as by means of suitable adhesive, pad 54 extending onto the adjacent portion of inner surface 48 of forward part 45. As best seen in FIG. 11, shoulder 47 of shoe member 44 and resilient pad 54 curve downwardly in order generally to conform to the configuration of the anterior surfaces 38 of the cow's rear leg.

In order to mount shoe member 44 on milking parlor 41 so that the same may be held in restraining engagement with cow 11, the arrangement now to be described is provided. Shoe member 44 is provided with an integral boss 55 formed on its outer surface slightly forwardly of shoulder 47. Boss 55 has a socket formed therein in which outer end 56 of supporting rod 57 is secured; rod 57 in the illustrated embodiment has a hollow rectangular cross-section, as shown in FIG. 12. Rod 57 extends outwardly from the shoe member 44 and generally at right angles thereto.

Supporting rod 57 is telescopically arranged within a supporting sleeve 58 for axial movement with respect thereto, as shown by the arrows 60 in FIG. 10. Supporting rod 57 and shoe member 44 are moved longitudinally with respect to sleeve member 58 by means of a lead screw 59 positioned within sleeve member 58 and extending into the hollow supporting rod 57 as shown; lead screw 59 may conveniently be formed by the simple expedient of twisting a suitable iron bar in a helical configuration as shown. In order to cause supporting bar 57 with shoe member 44 thereon to be moved inwardly or outwardly with respect to sleeve 58, a pair of strap or rod elements 61 and 62 extend across the interior of supporting bar 57 at angles with respect to the axis thereof and at right angles with respect to each other, strap members 61 and 62 cooperating with the lead screw 59 so that rotation of the lead screw 59 causes movement of supporting rod 57 and its attached shoe member 44 inwardly or outwardly with respect to sleeve 58 depending on the direction of rotation of lead screw 59.

Lead screw 59 is manually rotated thereby selectively to move supporting rod 57 and shoe member 44 between an outer position as shown in FIG. 9 with shoe member 44 in engagement with the cow 11 and an inner position as shown in dashed lines 63 in FIG. 9 with shoe member 44 out of engagement with cow 11 by means of a suitable crank 64 having its ends 65 connected to portions 66 of member 67 by means of a suitable pin 68. Member 67 is rotatably seated within a suitable cup-shaped member 69 and is attached to inner end 71 of lead screw 59 which extends through and is journalled in an opening in the bottom portion of cup-shaped member 69. Crank 64 is normally held in locking position with slots 72 formed on the peripheral edge of cup-shaped member 69 by means of a compression spring 73 positioned between the member 67 and the end 65 of the crank 64. Crank 64 may, however, manually be moved to the position shown in dashed lines at 74 so that it is out of engagement with slot 72 and may then manually be rotated to rotate member 67 and in turn the lead screw 59, thereby selectively to move supporting rod 57 and shoe 44 inwardly or outwardly, as desired. Release of manual pressure on crank 64 permits compression spring 73 to return the crank to the position shown in FIG. 10 in engagement with one of the slots 72, thereby locking supporting bar 57 and shoe member 44 in the desired position.

Another bar 75, which may again have a hollow rectangular configuration, is attached to the side of sleeve member 58 adjacent the forward end thereof, as by welding at 76, bar 75 extending outwardly and rearwardly therefrom, and generally at right angles thereto, as shown in FIG. 10. In the particular milking parlor arrangement shown in FIG. 9, supporting bar 75 extends into the tubular horizontal element 43. In order selectively to position supporting bar 75 and thus in turn shoe 44 longitudinally, a mounting bracket assembly 77 is provided attached to the vertical element 42. Mounting bracket 77 for supporting bar 75 comprises a first member 78 attached to vertical element 42 in any suitable manner, as by means of a suitable U-clamp 79, as shown in FIG. 13. Member 78 has a central opening 80 formed therein coaxial with the interior of the tubular element 43. Member 78 further has its lower portion transversely split, as at 81, split 81 communicating with the central opening 80 and defining clamping legs 82 and 83. Locking member 84 is provided having a portion 85 rotatably journalled in central opening 80 in member 78. It will now be readily seen that locking member 84 can itself be clamped in any rotational position in a vertical plane by means of a suitable threaded fastener 86 which extends through the clamping legs 82 and 83 of member 78; tightening nut 87 on threaded fastener 86 forces legs 82 and 83 together, thereby frictionally clamping the bearing portion 85 of the locking member 84.

Locking member 84 has a rectangular central opening 88 formed therethrough proportioned slidingly to receive and support the supporting bar 75, as shown. Supporting bar 75 therefore can be moved inwardly and outwardly in opening 88 and is horizontal milking parlor element 43, as best seen in FIG. 14. Supporting bar 75 and thus in turn sleeve 58, supporting bar 57 and restraining shoe member 44 are locked in selectively predetermined positions in a horizontal plane by means of manually actuated locking pin 89 engageable with a plurality of longitudinally spaced apart holes 91 extending through the wall of supporting bar 75. Locking pin 89 extends through suitable openings 92 and 93 in portions 94 and 95 of locking member 84, and is held in locking position, i.e., so that it normally extends through the hole 91 in supporting bar 75 by means of a suitable spring 96 having one end bearing against portion 94 of locking member 84 and its other end bearing against washer element 97, which is secured to locking pin 89.

It will now be seen that the restraining shoe 44 can be selectively moved between outer and inner positions by means of manual adjustment of crank 64, can be selectively pivoted in a vertical plane by means of the rotation of locking member 84 in member 78 and frictionally clamped in the desired pivoted position by the cooperation of threaded fastener 86, 87 with legs 82 and 83 thereof, and further can be selectively moved horizontally and locked in the desired position by means of the cooperation of locking pin 89 with holes 91 in the supporting bar 75; it is thus seen that the position of shoe member 44 can readily be adjusted to conform to cows of different height and length, and further that the shoe member 44 can be readily moved into and out of restraining engagement with the cow. It will further be seen that when the shoe member 44 is moved into restraining engagement with cow 11, pad 54 on shoulder portion 47 bears against the anterior surface 38 of the cow's rear leg against the stifle joint 39 with forward portion 45 bearing against the flank 37 and rearward portion 46 bearing against the outer portion of the rear leg, thereby effectively restraining kicking. The frictional clamping of locking member 84 in bracket member 78 permits ready adjustment of the height of shoe 44 without necessitating loosening threaded fastener 86, 87. Furthermore, and most importantly, this frictional clamping provides a release which prevents damage to the apparatus and/or injury to the cow in the event that the cow slips or falls; if the cow falls, shoe member 44, rod 57 and sleeve 58 will be forced downwardly thereby whereas if a positive lock were provided, falling of the cow would cause breaking of the locking connection or injury to the animal.

Referring now to FIGS. 15, 16 and 17, in which like elements are still indicated by like reference numerals, it will be readily seen that the shoe member 44 with its associated supporting bar 57, sleeve 58, crank and lead screw assembly 64, 59, and supporting bar assembly 75 can readily be mounted on a horizontal element 98 of a milking parlor 99, such as the type manufactured by the Starline Company. Here, a mounting bracket assembly 101 is provided comprising an elongated sleeve member 102 which telescopically receives and supports supporting bar 75. Sleeve member 102 of mounting bracket assembly 101 is secured to the horizontally disposed tubular element 98 of milking parlor 99 by means of a pair of U-clamp members 103 and 104 as shown. U-clamp member 104 also provides locking of supporting bar 75 in the desired position, U-clamp member 104 comprising a first member 105 embracing tubular element 98, a second member 106, and threaded U-bolt member 107. It will be readily seen that sleeve member 102 is clamped between mating recesses 108 and 109 in members 105 and 106 and that the entire assembly is held in position on tubular element 98 by means of tightening nuts 111 and 112 on the ends of U-bolts 107, 107a. Locking pin 89 is in turn seated in suitable openings in portions 113 and 114 of member 106 and is normally held in locking position in an opening 91 in supporting bar 75 by means of the spring 96 extending between portion 113 and washer 97 on pin 89. It will be readily comprehended that the other U-clamp assembly 103 is similarly constructed with the locking pin mounting arrangement being merely eliminated from portion 106(a) thereof.

It will now be readily seen that in the embodiment of FIGS. 15, 16 and 17, shoe member 44 with supporting bar 57, sleeve 58, and the crank and lead screw assembly 64, 59 can again be selectively pivoted in a vertical plane and frictionally clamped in the desired pivoted position by the simple expedient of loosening nuts 111 and 112 on the U-bolts 107, 107a of the mounting bracket 101, rotating bracket 101 around tubular element 98 to the desired position, and again clamping the nuts 111 and 112 on the U-bolts. In common with the embodiment of FIGS. 9 through 14, the shoe 44 is selectively moved longitudinally and locked in the desired position by the cooperation of locking pin 89 with holes 91 in the supporting bar 75. It will further be seen that the assembly of the shoe member 44, supporting bar 57, sleeve 58, together with crank 64 and lead screw 59 and supporting bar 75 are identical in the embodiments of FIGS. 9 through 14, and 15 through 17, and thus this assembly can be used interchangeably with either mounting arrangement. It will also be seen that the frictional clamping of bracket 101 to stall element 98 functions in the same manner as the clamping of members 84 and 78 in the embodiment of FIGS. 9 through 15, i.e., to permit vertical adjustment of shoe 44 without requiring loosening of clamping nuts 111, 112 on U-bolts 107, 107a, and to provide a friction release in the event of falling or slipping of the cow. It will further be readily comprehended that other mounting arrangements embodying the principles of my arrangement can be employed with different milking parlor and cow stall constructions.

In an actual restraining apparatus constructed in accordance with FIGS. 9 through 17, shoe member 44 has an overall length of approximately 14 inches with forward portion 45 having a width forwardly of the depending portion 53 of approximately 4 inches and with the rearward portion 46 having a width rearwardly of shoulder 47 of approximately 4¾ inches; depending portion 53 extends downwardly below the lower extremity of the forward portion of forward part 45 approximately 2½ inches, and the width of shoulder portion 47 with pad 54 secured thereto varies from approximately 1½ inches at the top of the shoe 44 to 1¾ inches at the bottom thereof.

It will now be readily seen that I have provided an arrangement for restraining kicking of milking cows which is characterized by its simplicity and flexibility, the device being far more effective and less time consuming than any other kicking restraining apparatus known to the present applicant.

While I have described and illustrated several embodiments of my invention, further modifications and improvements will be apparent to those skilled in the art and I desire therefore in the appended claims to cover all modifications which do not depart from the spirit and scope of my invention.

What is claimed is:

1. Restraining apparatus for milking cows comprising: a shoe member for pressing against a cow to be restrained; an elongated supporting bar having one end attached to the outer surface of said shoe member and extending outwardly therefrom generally at right angles thereto, the other end of said bar being telescopically supported by an elongated sleeve member; screw means in said sleeve member cooperatively engaging said supporting bar; manually actuated means connected to said screw means and disposed at the end of said sleeve member remote from said supporting bar whereby said screw means selectively moves said supporting bar and said shoe member between inner and outer positions; a second elongated bar connected to said sleeve member and extending outwardly therefrom generally at right angles thereto and generally in a horizontal plane; and a mounting bracket means arranged to receive said second bar and adapted to be connected to an element of a cow stall for supporting said apparatus therefrom, said bracket including means for selectively positioning said second bar in different positions in a horizontal plane and means for selectively pivoting said second bar in a vertical plane thereby positioning said shoe member to accommodate cows of different length and height.

2. The combination of claim 1 in which said mounting bracket means comprises a first member adapted to be attached to a vertical element of a cow stall; and a second member supported by said first member for rotation in a vertical plane, said second member receiving said second bar and including locking means for selectively securing said second bar in different positions in a horizontal plane; said first member including frictional clamping means for selectively securing said second member in different rotational positions.

3. The combination of claim 1 in which said mounting bracket means comprises a first member with means for attaching the same to a vertical element of a cow stall, said first member having an opening formed therein; and a second member journalled in said first member opening for rotation in a vertical plane, said second member having an opening formed therethrough receiving said second bar and including locking means for selectively securing said second bar in different positions in a horizontal plane; said first member including frictional clamping means for selectively securing said second member in different rotational positions.

4. The combination of claim 1 in which said mounting bracket means comprises another sleeve member with frictional clamping means for attaching the same to a horizontal element of a cow stall in selectively predetermined positions in a vertical plane, said other sleeve member telescopically receiving said second bar and including locking means for selectively securing said second bar is different positions in a horizontal plane.

References Cited in the file of this patent

UNITED STATES PATENTS

| | | |
|---|---|---|
| 1,047,104 | Moss | Dec. 10, 1912 |
| 1,195,419 | Trim | Aug. 22, 1916 |
| 2,331,247 | Symons | Oct. 5, 1943 |
| 2,508,779 | Vociscano | May 23, 1950 |
| 2,655,900 | Basler et al. | Oct. 20, 1953 |
| 2,904,005 | Mielke et al. | Sept. 15, 1959 |
| 2,957,451 | Brockman | Oct. 25, 1960 |